April 2, 1940.  H. G. BROWN  2,196,137
AUTOMATIC BRAKE ADJUSTER
Filed Feb. 23, 1939
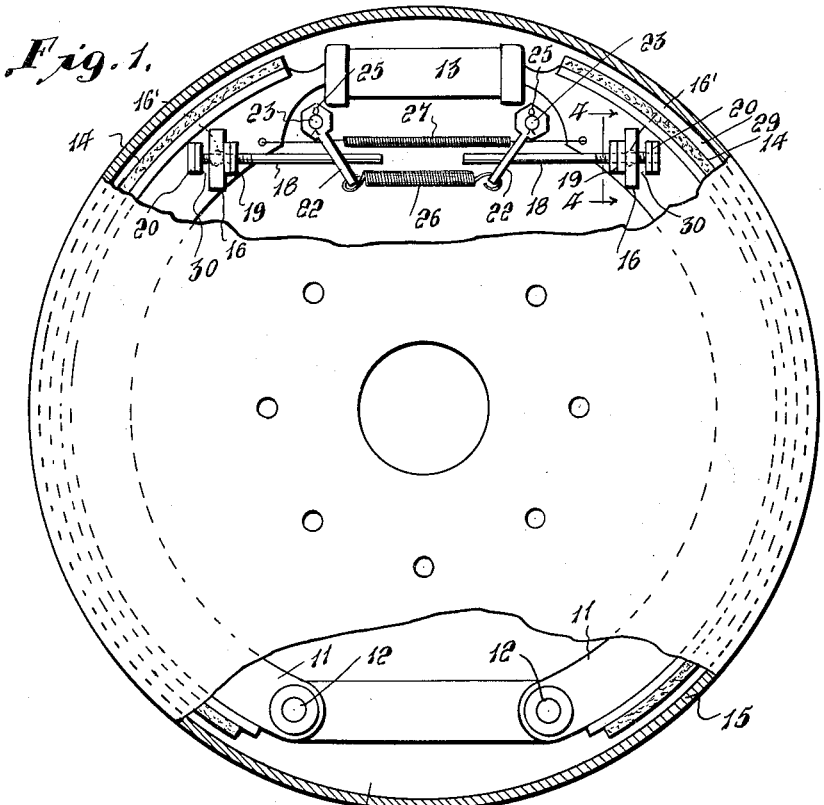
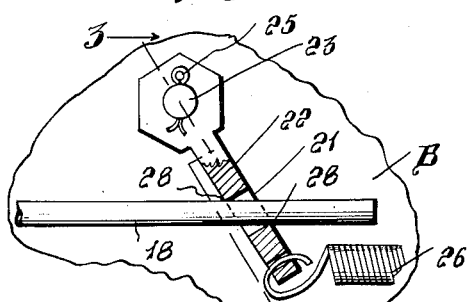
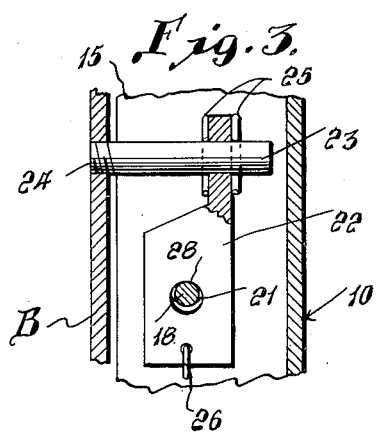
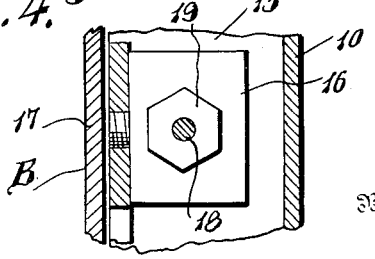
Inventor
Harold G. Brown
Attorney Patented Apr. 2, 1940

2,196,137

UNITED STATES PATENT OFFICE 2,196,137

AUTOMATIC BRAKE ADJUSTER

Harold G. Brown, Scottsville, Ky.

Application February 23, 1939, Serial No. 258,062

3 Claims. (Cl. 188—79.5)

This invention relates to a means for maintaining brakes at the proper adjustment, at all times, and more specifically aims to provide a construction wherein the shoes or movable brake parts will automatically slip or move to compensate for wear and thereby be in predetermined adjusted position.

The more specific objects and advantages will become apparent from a consideration of the description following taken in connection with the accompanying drawing illustrating an operative embodiment.

In said drawing:

Figure 1 is a view in elevation showing my improvements applied to conventional brake mechanism;

Figure 2 is an enlarged detail partly in elevation and partly in section showing the holding means for one of the rods attached to the brake shoes;

Figure 3 is a sectional view taken on the line 3—3 of Figure 2, and

Figure 4 is a detail section taken on the line 4—4 of Figure 1.

Referring specifically to the drawing wherein like reference characters designate like or similar parts, the brake mechanism is shown in Figure 1 to the best advantage, of the type adapted for use primarily in connection with automobile wheels, although not limited to such use. In such drawing, 10 designates a conventional drum or rotatable part as carried by the wheel and 11 are brake shoes of the internal expanding type pivoted as at 12 to the usual backing plate or stationary part B, the shoes being adapted for expansion by any suitable means, such as a hydraulic cylinder 13 connected in a conventional hydraulic brake system. Said shoes are lined as is conventional at 14 for engagement with the flange 15 of the drum 10.

Adjacent the upper end of each shoe 11 is a bracket 16 having a stud 17 detachably screw threaded to the shoe as best seen in Figure 4. Slidably disposed through openings 16' in brackets 16 are rods 18. The movement of the shoes 11 is governed along the rods 18, to the predetermined clearance, by fixed abutments 19 on such rods on the inner sides of the brackets and abutments 20 on such rods on the outer sides of the brackets, the latter being detachable and adjustable and for instance in the form of nuts, if desired. The shoes 11 may move relatively to the rods 18 the distance between the abutments 19 and 20 associated with the respective shoes.

Said rods 18 pass through openings 21 in detent arms 22 which are pivotally mounted on posts 23 screwed at 24 to the aforesaid backing plate or stationary part B and held in position on such posts as by means of cotter keys or the equivalent at 25. Such arms 22 are in downwardly converging relation and are urged together by a contractile coil spring 26.

A contractile coil spring 27 as is conventional draws the upper ends of the brake shoes toward each other and thereby urges the brake shoes to off position.

Due to the angular disposition of the arms 22, such arms at the edges of openings 21 as at diagonally opposite locations 28, frictionally engage or bite into the rods 18, whereby such rods 18 cannot move inwardly toward each other but they permit the rods 18 to be pulled outwardly or away from each other. Hence, as the linings 14 wear, rods 18 will be pulled outwardly from each other and with respect to the arms 22 upon application of the brakes, to the extent necessary to compensate for such wear, the edges 28 maintaining the rods 18 against retraction or return to the initial position. It will be realized that the brake lining has the clearance shown at 29 and that this clearance corresponds to that at 30, being the extent of movement the shoes 11 may move on the rods 18. The clearance as a result will always be the same but the rods 18 will automatically move outwardly to limit the retraction of the shoes, in compensation for wear.

Various changes may be resorted to provided they fall within the spirit and scope of the invention.

I claim as my invention:

1. Brake mechanism of the class described having shoes applicable through movement away from each other, rods connected to the shoes and relatively to which the shoes are adapted to move to determine the extent of the release movement of the shoes, arms preventing movement of the rods toward each other, said arms being slip-connected to the rods to permit outward movement of the rods relatively to the arms to automatically compensate for wear of the shoes, said arms being in downwardly converging relation, spring means urging said arms toward each other, and stop means limiting the movement of each shoe relatively to the associated rods to govern the release movement of the shoes.

2. Brake mechanism of the class described having shoes applicable through movement away from each other, rods connected to the shoes and relatively to which the shoes are adapted to move to determine the extent of the release movement of the shoes, arms preventing movement of the rods toward each other, said arms being slip-connected to the rods to permit outward movement of the rods relatively to the arms to automatically compensate for wear of the shoes, said arms having openings through which the rods pass, said arms being in downwardly diverging relation whereby the arms at the edges of said openings will bite the rods, spring means urging the arms together, and stop means limiting the movement of each shoe relatively to the associated rods to govern the release movement of the shoes.

3. Brake mechanism of the class described having shoes applicable through movement away from each other, rods connected to the shoes and relatively to which the shoes are adapted to move to determine the extent of the release movement of the shoes, arms preventing movement of the rods toward each other, said arms being slip-connected to the rods to permit outward movement of the rods relatively to the arms to automatically compensate for wear of the shoes, said arms having openings through which the rods pass, said arms being in downwardly diverging relation whereby the arms at the edges of said openings will bite the rods, spring means urging the arms together, brackets on the shoes through which the rods pass, and abutments on each of the rods spaced a greater distance apart than the width of the associated bracket and disposed on opposite sides of the latter to govern the release movement of the shoes.

HAROLD G. BROWN.